United States Patent
Sukhija et al.

(10) Patent No.: US 10,467,066 B2
(45) Date of Patent: Nov. 5, 2019

(54) SYSTEM AND METHOD FOR ESTABLISHING COMMON REQUEST PROCESSING

(71) Applicant: Visa International Service Association, San Francisco, CA (US)

(72) Inventors: Rohit Sukhija, Bangalore (IN); Ravi Kumar Battula, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 15/913,638

(22) Filed: Mar. 6, 2018

(65) Prior Publication Data
US 2019/0278637 A1 Sep. 12, 2019

(51) Int. Cl.
*G06F 9/54* (2006.01)

(52) U.S. Cl.
CPC ............ *G06F 9/542* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 2002/0152456 A1* | 10/2002 | Nightingale | G06F 11/3664 717/135 |
| 2002/0169815 A1* | 11/2002 | Wong | G06F 11/261 718/100 |
| 2004/0153830 A1 | 8/2004 | Cebula et al. | |
| 2007/0169015 A1* | 7/2007 | Seelig | G06F 8/20 717/136 |
| 2008/0115116 A1* | 5/2008 | Francis | G06F 11/3696 717/135 |
| 2009/0007073 A1* | 1/2009 | Huang | G06F 11/3696 717/124 |
| 2009/0132877 A1 | 5/2009 | Hushyar et al. | |
| 2010/0212931 A1 | 8/2010 | Park et al. | |
| 2013/0152047 A1* | 6/2013 | Moorthi | G06F 11/368 717/124 |
| 2013/0283238 A1* | 10/2013 | Levi | G06F 11/3696 717/126 |
| 2017/0046253 A1 | 2/2017 | Ganda et al. | |

(Continued)

OTHER PUBLICATIONS

International Search Report and Written Opinion, mailed Jun. 21, 2019, in PCT Application No. PCT/US2019/020260, 10 pages.

*Primary Examiner* — Shih-Wei Kraft
(74) *Attorney, Agent, or Firm* — Kilpatrick Townsend & Stockton LLP

(57) ABSTRACT

A method is disclosed. An implementation establishment system may receive a first message including a request method model and a template from a request processor. The implementation establishment system may generate at least one test API call based on the request method model and the template. The implementation establishment system may then transmit the at least one test API call to the request processor. The implementation establishment system may receive at least one response based on the at least one test API call from the request processor. The implementation establishment system may evaluate the at least one response. The implementation establishment system may generate a response notification based on the at least one response. The implementation establishment system may transmit the response notification to the request processor.

10 Claims, 3 Drawing Sheets

(56) References Cited

U.S. PATENT DOCUMENTS

| | | |
|---|---|---|
| 2017/0155743 A1 | 6/2017 | Sukhija et al. |
| 2017/0364436 A1* | 12/2017 | Staykov .............. G06F 11/3664 |
| 2018/0060210 A1 | 3/2018 | Pandey et al. |

* cited by examiner

SYSTEM AND METHOD FOR ESTABLISHING COMMON REQUEST PROCESSING

CROSS-REFERENCES TO RELATED APPLICATIONS

None.

BACKGROUND

In current systems and methods request messages from requesting systems to request processors are sent through a request formatting platform. For example, a requesting system that is a resource provider computer may transmit a request message requesting authorization may transmit the request message to the request processor of a authorizing entity computer via a request formatting platform. After receiving requests from the requesting systems, the request formatting platform may generate formatted requests for request processors according to specifications of a common request processing API. The same common request processing API may be used by the request formatting platform to communicate with all of the request processors according to one particular format.

However, by doing so, the request processors need to be coded to the API specification of the request formatting platform. Typically, this is done through manually setting up API calls between the request processor and the request formatting platform and then troubleshooting. To do this, users of the request processor provide end point details to users of the request formatting platform, usually via email. The users of the request processor then provide which API services they wish to use to the users of the request formatting platform. The users of the request processor then code their system to be able to receive calls in a format corresponding to the common request processing API. The users of the request processor email, or otherwise contact, the users of the request formatting platform stating that they are ready to receive API calls. After coordinating dates and times, the request formatting platform can transmit API calls to the request processor. The request processor can respond to API calls. The users of the request formatting platform may then determine if the API calls were received in the correct format. The users of the request formatting platform may then discuss with the users of the request processor to decide how to configure the request processor so it correctly responds to API calls.

Once the request processor is configured, many more rounds of API calls and responses can take place. After the request processor correctly generates responses, the users of the request processor may ask for certification from the request formatting platform.

This process has several disadvantages. One is that the request formatting platform needs to have a dedicated support and integration team to onboard request processor details onto the request formatting platform, and to initiate tailored API calls to test the request processor's responses. Another problem is that request processors that code to a specific API have a high dependency on the request formatting platform to onboard and test the request processor's responses against that API.

These problems lead to lower efficiencies, longer time to market, and a solution with bugs and project management issues due to interdependencies on external systems to which a request processor needs to comply with. Doing this with multiple request processors multiplies the problem significantly.

Embodiments of the invention address these and other problems individually and collectively.

SUMMARY

Embodiments of the invention solve these problems by allowing request processors to automatically establish implementations for responding to requests.

One embodiment of the invention includes a method comprising: a method comprising: receiving, by an implementation establishment system, a first message including a request method model and a template from a request processor; generating, by the implementation establishment system, at least one test API call based on the request method model and the template; transmitting, by the implementation establishment system, the at least one test API call to the request processor; receiving, by the implementation establishment system, at least one response based on the at least one test API call from the request processor; evaluating, by the implementation establishment system, the at least one response; generating, by the implementation establishment system, a response notification based on the at least one response; and transmitting, by the implementation establishment system, the response notification to the request processor.

Another embodiment of the invention includes an implementation establishment system comprising: a processor; a memory device; and a computer-readable medium coupled to the processor, the computer-readable medium comprising code executable by the processor for implementing a method comprising: receiving a first message including a request method model and a template from a request processor; generating at least one test API call based on the request method model and the template; transmitting the at least one test API call to the request processor; receiving at least one response based on the at least one test API call from the request processor; evaluating the at least one response; generating a response notification based on the at least one response; and transmitting the response notification to the request processor.

Another embodiment of the invention includes a method comprising: transmitting, by a request processor, a first message including a request method model and a template to an implementation establishment system; receiving, by the request processor, at least one test API call based on the request method model and the template from the implementation establishment system; generating, by a client request stub of the request processor, a response based on the at least one test API call; transmitting, by the request processor, the response to the implementation; establishment system; receiving, by the request processor, a response notification based on the response, from the implementation establishment system; and determining, by the request processor, whether or not to configure the client request stub.

Another embodiment of the invention includes a request processor comprising: a processor; a memory device; and a computer-readable medium coupled to the processor, the computer-readable medium comprising code executable by the processor for implementing a method comprising: transmitting a first message including a request method model and a template to an implementation establishment system; receiving at least one test API call based on the request method model and the template from the implementation establishment system; generating a response based on the at least one test API call; transmitting the response to the implementation establishment system; receiving a response notification based on the response, from the implementation establishment system; and determining whether or not to configure a client request stub.

These and other embodiments are described in further detail below, with reference to the Figures and Detailed Description.

DETAILED DESCRIPTION

Figure 1:
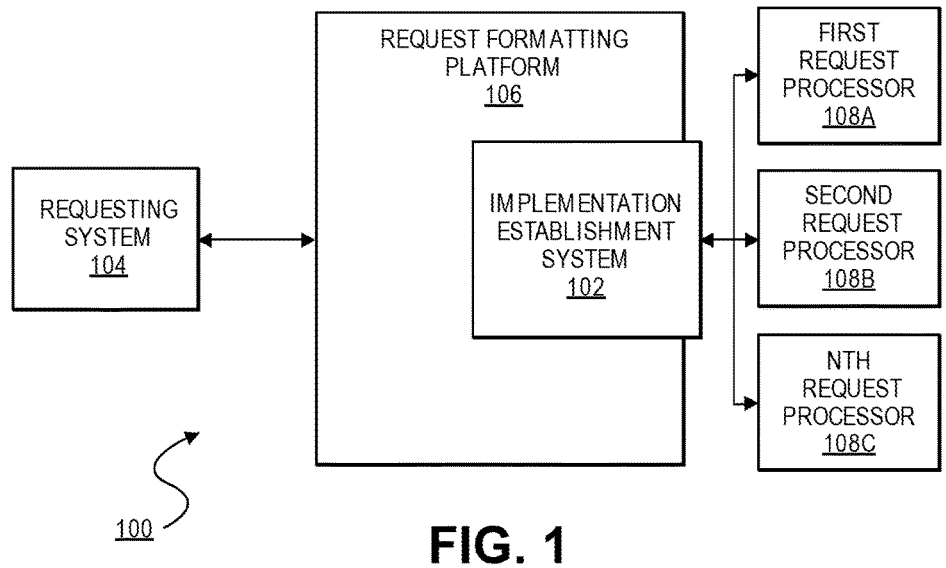
FIG. 1 shows a block diagram of a system for processing requests according to an embodiment of the invention.

Prior to discussing embodiments of the invention, some terms can be described in further detail.

An "application programming interface" or "API" may be a set of definitions, protocols, and tools for building and maintaining software and applications. An API may be for a server computer, a network-based system, an operating system, a database system, computer hardware, and/or computer software. A "common request processing API" may be any API configured to process requests (e.g., format requests, act on requests, respond to requests, etc.) that is common amongst multiple entities. For example, a common request processing API may be implemented by a request formatting platform that receives and formats requests, as well as by multiple request processors that receive, act on, and respond to formatted requests, such that the request formatting platform may communicate similarly (e.g., in a similar format) with the multiple request processors.

"Specifications" may include one or more requirements and/or details of something. In some embodiments, specifications for an application programming interface (API) may include requirements for routines, data structures, object classes, variables, and/or remote calls. For example, specifications for an API may specify that a particular routine be run on requests to generate formatted requests. In another example, specifications for an API may specify a particular structure or format to be used in generating a response to a formatted request.

An "implementation" may be a program or software component that is considered by a implementation establishment system to be fully functional and complete. More than one implementation may exist for a specification.

A "stub" may be a piece of code or a program used to stand in for some other programming functionality. In some embodiments, the stub may be an incomplete implementation. The stub may be configured and/or altered to become an implementation. For example, a request processor may use a stub to generate responses that are in response to a request, wherein the stub may generate an incorrect response. If the stub generated an incorrect response then the stub may be configured not to generate the incorrect response. In some embodiments, if the stub does not generate incorrect responses then the stub may be considered an implementation.

A "request method model" may be a model for request processing. The request method model may include at least one request method. In some embodiments, the request method may include API services that the request processor supports, a sequence of API services that the request processor supports, API fields that the request processor supports as required, and/or the API fields that the request processor supports as optional. In some embodiments, different request processors may be associated with different request method models. For example, a request method model may include a request method relating to a bank transfer, with the API services of "payment processing," "refund service," and "status service." Any suitable request method may be used. Any suitable API service may be used. In some embodiments, the request method may relate to payments, healthcare, banking, retail, shipping, utilities, data management, education, or manufacturing.

"Fields" may refer to divisible sets of data in fixed or known locations. For example, a message may include one or more different fields. Each field may have a type and/or a location. A type of a field may be, for example, an identifier for a requesting system, whereas the field may include "Resource_Provider_A". A location of the field may be, for example, the first field at the beginning of a message. The field may be parsable due to its known location. A field may be of fixed or variable length. If a field has fixed length, the field will be easily parsable as it always has a particular number of characters. In some embodiments, leading zeroes (or another value) may be added to a field to make it the proper fixed length. If a field has a variable length, the field may be parsable from other fields in a message through the use of a separator (e.g., one or more spaces, one or more punctuation marks, or any other characters).

A "format" may refer to an arrangement, organization, size, shape, and/or makeup of something. For example, a format of a message may include a number of fields in the message, sizes of fields in the message, types of fields in the message, location (e.g., arrangement) of fields in the message, spacing between fields and in other locations of the message, and/or punctuation in and between fields and in other locations of the message.

An "identifier" may refer to any combination of letters, numbers, and/or symbols used to uniquely identify something. An identifier may be assigned randomly, consecutively, or according to any pattern or algorithm. In some embodiments, a requesting system may be associated with an identifier that may be used to identify the requesting system to a request formatting platform.

A "request" may be any message sent between entities that asks for something. A request may originate from one entity and be sent to another entity to ask for something. In some embodiments, a request may ask for information, data, action, inaction, services, applications, and the like. A request may be transmitted by any suitable method, such as, for example, over a network. A request may include any combinations of letters, numbers, and/or symbols that may be interpreted by the receiving entity. In some embodiments, a request may be encrypted, hashed, encoded, or otherwise obfuscated. A request may be in the form of, for example, an API call. A request may have any format. A "formatted request" may be a request that has been converted into a particular format.

A "request processor" may be an entity (e.g., a system or server computer) that includes one or more electronic components that can process requests received from another entity (e.g., system, device or server computer). For example, a request processor can be a computing device that includes at least one processor coupled to a memory that stores instructions or code for execution by the processor. A request processor may provide remote communication capabilities to a network. A request processor can be configured to transmit and receive data or communications to and from other devices. In some examples, a request processor may be or be operated by a service provider.

A "requesting system" may be an entity (e.g., system or device) that includes one or more electronic components (e.g., an integrated chip) that can communicate requests to another entity (e.g., system, device or server computer). For example, a requesting system can be a computing device that includes at least one processor coupled to a memory that stores instructions or code for execution by the processor. A requesting system may provide remote communication capabilities to a network. A requesting system can be configured to transmit and receive data or communications to and from other devices. A requesting system may be in the form of a computer, an access device (e.g., a point of sale device), a mobile device such as a mobile phone (e.g., smart phone, cellular phone, etc.), tablets, portable media player, personal digital assistant devices (PDAs), wearable computing device (e.g., watch), health monitoring device, electronic reader device (e.g., a card reader device), an Internet-of-Things (IoT) device, etc., or in the form of a card (e.g., smart card) or a fob, etc. Examples of requesting systems may also include portable computing devices (e.g., laptops, netbooks, ultrabooks, etc.). A requesting system may also be in the form of a vehicle (e.g., an automobile), or be integrated as part of a vehicle (e.g., an infosystem of a vehicle).

A "resource" may be any tangible or intangible asset. Exemplary resources include money, labor, data, software, goods, information, services, and the like.

A "response" may be any message sent between entities that responds to a request. A response may originate from one entity and be sent to another entity to provide an answer, outcome, or reaction to a request, although every request does not necessarily need or have a response. A response may be transmitted by any suitable method, such as, for example, over a network. In some embodiments, a response may include information, notifications, reports, data, action, inaction, services, applications, and the like. A response may include any combinations of letters, numbers, and/or symbols that may be interpreted by the receiving entity. In some embodiments, a response may be encrypted, hashed, encoded, or otherwise obfuscated. A response may have any format. A "formatted response" may be a response that has been generated in a particular format.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. A request formatting platform may be an example of a server computer.

An "end point" may be an end of a communication channel. In some embodiments, the end point may be a universal resource locator (URL) used to communicate with an API. In other embodiments, the end point may be where requests and other API calls may reach for processing.

A. Systems

Systems are described below. The capabilities of the systems are described in further detail in the methods section.

FIG. 1 shows a block diagram of a system 100 comprising a number of components according to an embodiment of the invention. The system 100 comprises a requesting system 104, a request formatting platform 106, an implementation establishment system 102, a first request processor 108A, a second request processor 108B, and an Nth request processor 108C.

The requesting system 104 may be in operative communication with the request formatting platform 106. The request formatting platform 106 may be operatively coupled to the implementation establishment system 106F. The implementation establishment system 102 may be in operative communication with the first request processor 108A, the second request processor 108B, and the Nth request processor 108C.

The implementation establishment system 106F, the requesting system 104, the request formatting platform 106, the first request processor 108A, the second request processor 108B, and the Nth request processor 108C, may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

For simplicity of illustration, a certain number of components are shown in FIG. 1. It is understood, however, that embodiments of the invention may include more than one of each component. For example, there may be more than one requesting system 104. In some embodiments, there may be thousands of requesting systems 104.

The requesting system 104 may be a system or device capable of communicating with the request formatting platform 106. The requesting system 104 may transmit requests to the request formatting platform 106. The requests may be in any suitable format capable of being received by the request formatting platform 106. In some embodiments, the requesting system 104 may be associated with a requesting system identifier.

The request formatting platform 106 may be capable of receiving requests from the requesting system 104. The request from the requesting system 104 may be in a format conforming to the specification of the request formatting platform 106. In some embodiments, the request formatting platform 106 may be in operative communication with the first request processor 108A, the second request processor 108B, and the Nth request processor 108C. The request formatting platform 106 may perform any of the functions further described in U.S. patent application Ser. No. 15/355, 453, filed on Nov. 18, 2016, which is herein incorporated by reference in its entirety for all purposes.

The implementation establishment system 102 may be associated with the request formatting platform 106. In some embodiments, the implementation establishment system 102 may be a server computer. The implementation establishment system 102 may be capable of receiving data from the first request processor 108A and may be capable of transmitting data to the first request processor 108A.

In some embodiments, the implementation establishment system 102 may be capable of receiving a first message including a request method model and a template from the first request processor 108A. The implementation establishment system 102 may be capable of generating at least one test API call based on the request method model and the template. The implementation establishment system 102 may then be capable of transmitting the at least one test API call to the first request processor 108A.

Further, the implementation establishment system 102 may be capable of receiving at least one response based on the at least one test API call from the first request processor 108A. The implementation establishment system 102 may then be capable of evaluating the at least one response and generate a response notification based on the at least one response. The implementation establishment system 102 may be capable of transmitting the response notification to the first request processor 108A.

In other embodiments, the implementation establishment system 102 may receive a request message from the first request processor 108A. The request message may invoke the implementation establishment system 102 to generate a client request stub and a simulator module. In some embodiments, the implementation establishment system 102 may generate the client request stub. The implementation establishment system 102 may also generate the simulator module. In some embodiments, the implementation establishment system 102 may transmit the client request stub to the first request processor 108A.

The first request processor 108A, the second request processor 108B, and the Nth request processor 108C may be server computers. The first request processor 108A may be capable of receiving requests from the requesting system 104 via the request formatting platform 106.

In some embodiments, the first request processor 108A may be capable of onboarding itself onto the implementation establishment system 102 by providing request processor end points which may receive test API calls as well as API calls. The request processor end points may be URLs which are defined to receive test API calls as well as API calls in a particular format and then respond as per the specification of the common request processing API. The first request processor 108A may be capable of using the common request processing API. The first request processor 108A may build code adhering to the specification of the common request processing API.

The first request processor 108A may transmit the first message including the request method model and the template to the implementation establishment system 102. The first request processor 108A may receive at least one test API call based on the request method model and the template from the implementation establishment system 102. In some embodiments, after receiving the at least one test API call, the first request processor 108A may generate at least one response based on the at least one test API call. The first request processor 108A may then transmit the at least one response to the implementation establishment system 102. The first request processor 108A may then receive a response notification based on the at least one response, from the implementation establishment system 102.

In some embodiments, the first request processor 108A may be capable of transmitting a certification request to the request formatting platform 106. The implementation establishment system 102 may be capable of determining to certify the client request stub of the first request processor 108A based on at least the certification request. In other embodiments, the first request processor 108A may file a ticket with the implementation establishment system 102 for troubleshooting and help.

The second request processor 108B and the Nth request processor 108C may have similar or different characteristics to the first request processor 108A and description of common characteristics need not be repeated here.

Figure 2:
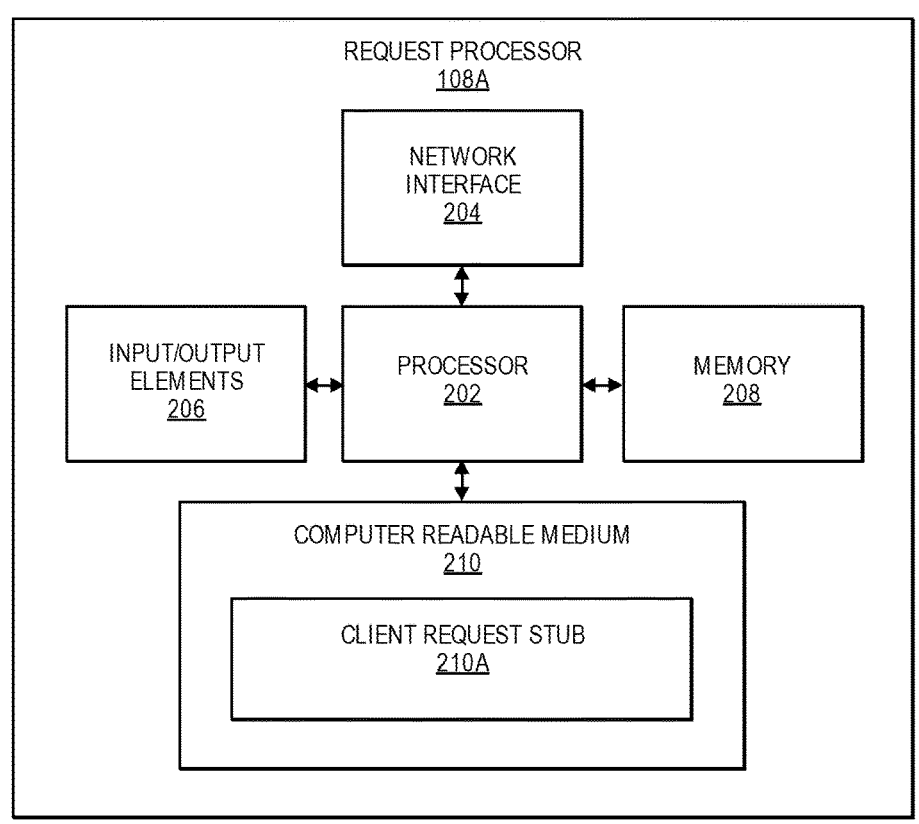
FIG. 2 shows a block diagram of a first request processor according to an embodiment of the invention.

FIG. 2 shows a block diagram of a first request processor 108A according to an embodiment of the invention. The first request processor 108A may comprise a processor 202, a network interface 204, input/output elements 206, a computer readable medium 210 comprising a client request stub 210A, and a memory 208.

The network interface 204 may include an interface that can allow the first request processor 108A to communicate with external computers or other nodes. For example, the network interface 204 may comprise a contact, Bluetooth, or Wi-Fi interface. In some embodiments, the network interface 204 may be configured to allow secure transmissions between the first request processor 108A and the implementation establishment system 102.

The input/output elements 206 may comprise any suitable devices that may output data. Examples of input elements may include buttons, touchscreens, touch pads, microphones, biometric scanners, etc. Examples of output elements may include display screens, speakers, and data transmission devices.

The computer readable medium 210 may comprise code, executable by the processor 202. The computer readable medium 210 may contain any number of applications, modules, and code. The computer readable medium 210 may comprise a number of modules including the client request stub 210A. The computer readable medium 210 may also comprise code, which when executed by the processor 202 may implement a method comprising: transmitting, a first message including a request method model and a template to an implementation establishment system; receiving, at least one test API call based on the request method model and the template from the implementation establishment system; generating, a response based on the at least one test API call; transmitting, the response to the implementation establishment system; receiving, by the request processor, a response notification based on the response, from the implementation establishment system; and determining, whether or not to configure a client request stub.

The client request stub 210A may be a stub. In other words, the client request stub 210A may not be a complete implementation. The client request stub 210A may be configured and/or altered to become an implementation. In some embodiments, the implementation establishment system 102 may determine if the client request stub 210A correctly responds to the test API calls. If the client request stub 210A correctly responds to the test API calls, in some embodiments, the implementation establishment system 102 may certify the client request stub 210A, wherein the client request stub 210A may then be considered an implementation.

The memory 208 may be coupled to the processor 202 and may store data, applications, keys, and any other suitable information. The memory 208 may be in the form of one or more memory devices (e.g., RAM, EEPROM, ROM chips), using any suitable mode of data storage. In some embodiments, the memory 208 in the first request processor 108A may also include a secure storage area for storing sensitive data such as cryptographic keys.

Figure 3:
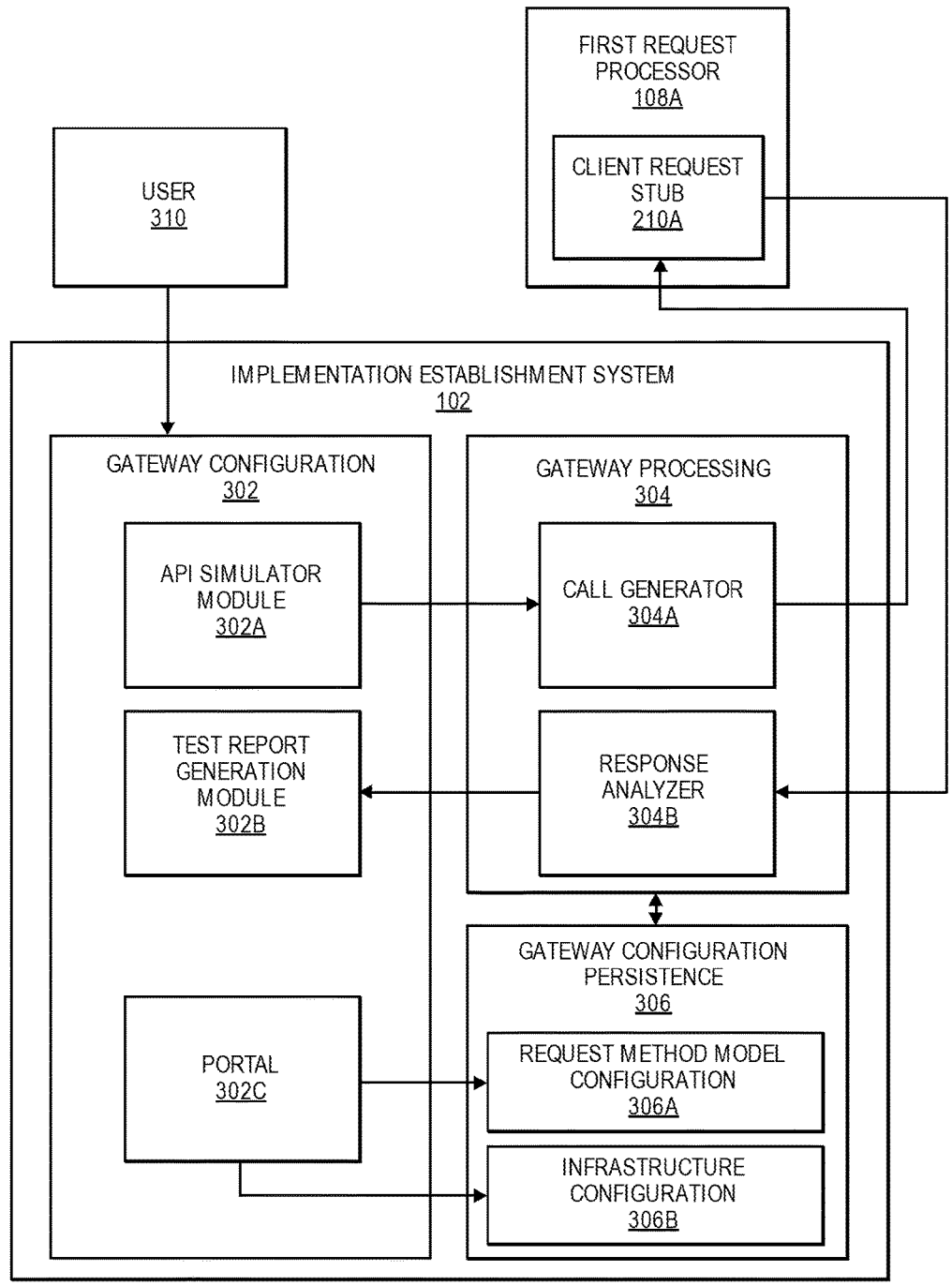
FIG. 3 shows a block diagram of an implementation establishment system according to an embodiment of the invention.

FIG. 3 shows a block diagram of an implementation establishment system 102 according to an embodiment of the invention. The implementation establishment system 102 may comprise a gateway configuration 302 including an API simulator module 302A, a test report generation module 302B, and a portal 302C, a gateway processing 304 including a call generator 304A and a response analyzer 304B, as well as a gateway configuration persistence 306 including a request method model configuration 306A and an infrastructure configuration 306B. FIG. 3 also shows a user 310 and the first request processor 108A including the client request stub 210A. In some embodiments, the user 310 may operate a computer, not shown.

The gateway configuration 302 may be operatively coupled to the gateway processing 304 and the gateway configuration persistence 306. The gateway processing 304 may be operatively coupled to the gateway configuration persistence 306. The user 310 may access the gateway configuration 302. The client request stub 210A may be in operative communication with the call generator 304A and the response analyzer 304B.

The gateway configuration 302 may be a gateway through which the user 310 of the first request processor 108A may configure request processor details, such as the request method model and the request processor infrastructure. The gateway configuration 302 may include the API simulator module 302A, the test report generation module 302B, and the portal 302C. In some embodiments, the gateway configuration 302 may be an interface through which the user 310 may access the API simulator module 302A, the test report generation module 302B, and the portal 302C. For example, the user 310 may access the API simulator module 302A via the gateway configuration 302 to start an API simulation.

The gateway processing 304 may be capable of processing data. The gateway processing 304 may include a call generator 304A and a response analyzer 304B. In some embodiments, the gateway processing may include modules capable of processing data. In some embodiments, the gateway processing 304 and the modules therein may not be accessed by the user 310.

The gateway configuration persistence 306 may be operatively coupled to the gateway processing 304 as well as the portal 302C. The gateway configuration persistence 306 may be capable of storing information and data. In some embodiments, the gateway configuration persistence 306 may be a memory or database, or a file in a memory or a database. The gateway configuration persistence 306 may include a request method model configuration 306A and an infrastructure configuration 306B.

The portal 302C may be a portal through which the first request processor 108A may access the gateway configuration persistence 306. The portal 302C may be capable of connecting the user 310 to the gateway configuration persistence 306 including the request method model configuration 306A and the infrastructure configuration 306B. In some embodiments, the portal 302C may allow the user 310 to input the request method model and the request processor infrastructure.

The request method model configuration 306A may store the request method model of the first request processor 108A. In some embodiments, the request method model configuration 306A may be configured to allow the user 310 to select API services that the first request processor 108A supports, the sequence of API services that the request processor supports, the API fields that the request processor supports as required, and the API fields that the request processor supports as optional. For example, the user 310 may select the request method of a healthcare request with the API services of "plan review service," "appointment service," and "status service." The request method model configuration 306A may then store the selection of the request method model by the user 310. In some embodiments, the portal 302C may be configured to allow the user 310 to edit the request method model and the infrastructure stored in the request method model configuration 306A.

The infrastructure configuration 306B may store the infrastructure of the first request processor 108A. In some embodiments, the infrastructure of the first request processor 108A may be the request processor's end points and the request processor's IP address. In some embodiments, the infrastructure configuration 306B may store other relevant infrastructure data such as information identifying the first request processor 108A. For example, the infrastructure configuration 306B may store the request processor's IP and end points as well as the name of the entity operating the first request processor 108A. In some embodiments, the first request processor 108A may be associated with a request processor identifier, which may be stored in the infrastructure configuration 306B.

The API simulator module 302A may be a module that when executed by a processor is capable of simulating an API. In some embodiments, the API simulator module 302A may receive the request method model and a template from the user 310 via the gateway configuration 302. The template may be a set of test scenarios for the implementation establishment system 102 to generate test API calls for. The first request processor 108A may be capable of creating and/or using a template to test the client request stub 210A. For example, the template may include a first test scenario in which the test API call is formatted with the correct fields, a second test scenario in which the test API call is formatted without the required "amount" field, a third test scenario in which the test API call is formatted with a non-supported currency code, and a fourth test scenario in which the test API call is formatted with a refund amount more than an original payment amount.

The API simulator module 302A in conjunction with a processor may invoke the call generator 304A to generate at least one test API call. In some embodiments, the API simulator module 302A may be capable of generating the client request stub 210A in response to receiving a first message including the request method model and the template, from the first request processor 108A.

In some embodiments, the API simulator module 302A in conjunction with a processor may generate the client request stub 210A based on the request method model. In some embodiments, the API simulator module 302A may generate the client request stub 210A such that the client request stub 210A may be capable of responding to test API calls and API calls relating to the request method model. For example, the API simulator module 302A may generate the client request stub 210A that may be capable of responding to payment API calls, by using the relevant payment API specification of the request formatting platform 106. In some embodiments, the API simulator module 302A may compile functions and/or code outlined by the common request processing API.

In other embodiments, the implementation establishment system 102 may be capable of generating the API simulator module 302A. The implementation establishment system 102 may receive a request message from the first request processor 108A, wherein the request message indicates a request to generate a simulator module. The implementation establishment system 102 may generate an API simulator module 302A for each request processor. For example, there may be four request processors that request the generation of an API simulator. The implementation establishment system 102 may generate four API simulator module for the four request processors.

In some embodiments, the generation of the API simulator module 302A may include the implementation establishment system 102 compiling premade functions, routines, data structures, object classes, variables, and/or remote calls according to the common request processing API specification. In other embodiments, the generation of the API simulator module 302A may be based on the request method model. For example, if the request method model relates to a bank transfer then the API simulator module 302A may include functions and premade code relating to a bank transfer.

The call generator 304A may be capable of generating at least one test API call. The at least one test API call may be related to the request method model of the first request processor 108A. The call generator 304A may be invoked by the API simulator module 302A. The call generator 304A may format the at least one test API call based on the common request processing API. The call generator 304A may transmit at least one test API call to the client request stub 210A of the first request processor 108A.

In some embodiments, if the call generator 304A receives the template from the API simulator module 302A, the call generator 304A may generate at least one test API call based on the template. For example, the template may include a first test scenario in which the test API call is formatted with the correct fields, a second test scenario in which the test API call is formatted without a required "doctor name" field, and a third test scenario in which the test API call is formatted without required "condition" and "date" fields. In this example, the call generator 304A may generate a first test API call including correctly formatted fields, a second test API call including a missing "doctor name" field, and a third test API including a missing "condition" field and a missing "date" field.

In some embodiments, the call generator 304A may generate at least one expected response. The at least one expected response may be a response that the implementation establishment system 102 expects to receive. The at least one expected response may be formatted based on the common request processing API. For example, if the test API call is formatted without the required "doctor name" field then the expected response may include an "error" field with subfields of "reason" and "location." In this example, the "reason" subfield may contain "doctor name is required" and the "location" subfield may contain "doctor name."

The first request processor 108A may include a client request stub 210A. The client request stub 210A may be in operative communication with the implementation establishment system 102. In some embodiments, the client request stub 210A may be in operative communication with the call generator 304A and the response analyzer 304B. The client request stub 210A may be a stub which may be a placeholder for the request processor's implementation. For example, the client request stub 210A may be an incomplete implementation that may need to be completed or may need to be certified, by the implementation establishment system 102.

The client request stub 210A may be capable of generating at least one response based on the at least one test API call. The client request stub 210A may be capable of transmitting the at least one response to the implementation establishment system 102. In some embodiments, if the client request stub 210A receives four test API calls, the client request stub 210A may generate four responses. The client request stub 210A may generate any suitable number of responses.

The response analyzer 304B may be capable of receiving at least one response from the client request stub 210A. The response analyzer 304B may analyze the at least one response. In some embodiments, the response analyzer 304B may receive the at least one response and then may log the at least one response in a memory or database. In some embodiments, the at least one response may be logged in the gateway configuration persistence 306.

In other embodiments, the response analyzer 304B may parse and analyze the at least one response, wherein parsing and analyzing the at least one response may include parsing the fields of the at least one response and determining if the at least one response matches the at least one expected response. In some embodiments, the response analyzer 304B may transmit the parsed and analyzed response to the test report generation module 302B. For example, the at least one response may be a string of data. The string of data may be parsed to obtain the fields, such as, "doctor name," "error," "location," etc. The parsed string of data, i.e. the fields and subfields, may be compared to the expected fields and subfields.

The test report generation module 302B may generate a response notification. In some embodiments, the test report generation module 302B may receive a parsed and analyzed response from the response analyzer 304B, wherein the test report generation module 302B may generate the response notification based on the parsed and analyzed response.

In some embodiments, the parsed and analyzed response may indicate differences between the response and the expected response. For example, there may be subfields corresponding to each field that indicates if the field matches the corresponding expected field.

In some embodiments, the test report generation module 302B may generate the response notification based on the at least one response to at least one test API call. The response notification may include an success indicator, a reason, and a list of differences. The success indicator may indicate if the response failed or if the response succeeded. The reason may describe why the response failed or succeeded. The list of differences may list differences between the response and the expected response.

The user 310 may be a user associated with the first request processor 108A. The user 310 may access the gateway configuration 302.

In other embodiments, the implementation establishment system 102 may further include a processor, a network interface, input/output elements, and a computer readable medium. For example, the computer readable medium of the implementation establishment system 102 may comprise code, which when executed by the data processor of the implementation establishment system 102 may implement a method comprising: receiving a first message including a request method model and a template from a request processor; generating at least one test API call based on the request method model and the template; transmitting the at least one test API call to the request processor; receiving at least one response based on the at least one test API call from the request processor; evaluating the at least one response; generating a response notification based on the at least one response; and transmitting the response notification to the request processor.

B. Methods

Figure 4:
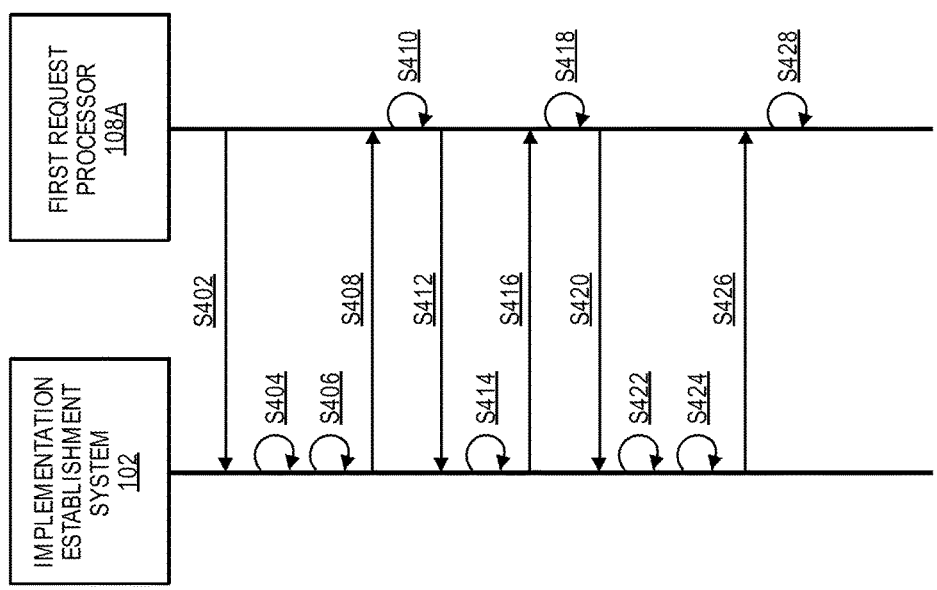
FIG. 4 shows a flow diagram illustrating a method for establishing an implementation for a request processor according to an embodiment of the invention.

FIG. 4 shows a flow diagram illustrating a method for establishing requests for a request processor according to an embodiment of the invention. The method illustrated in FIG. 4 will be described in the context of a request method model of a bank transfer. It is understood, however, that the invention can be applied to other circumstances (e.g., payments, healthcare, banking, retail, shipping, utilities, data management, education, manufacturing, etc.). Although the steps are illustrated in a specific order, it is understood that embodiments of the invention may include methods that have the steps in different orders. In addition, steps may be omitted or added and may still be within embodiments of the invention.

At step S402, the first request processor 108A may transmit a request message to the implementation establishment system 102. The request message may include a request to set up a client request stub 210A. In some embodiments, the request message may include the request method model and the infrastructure of the first request processor 108A. The infrastructure of the first request processor 108A may include end points, the request processor's IP address, the request processor identifier, and any other suitable information. The request method model may be stored in the request method model configuration 306A. The infrastructure of the first request processor 108A may be stored in the infrastructure configuration 306B.

In other embodiments, the user 310 of the first request processor 108A may input details for the request method model and the infrastructure of the first request processor 108A into the gateway configuration persistence 306, via the portal 302C.

In some embodiments, the first request processor 108A may be capable of defining the request method model such as which API services to use, which API fields to use for the request, and what use-cases to support. Some example API services may be "sale API service for payment processing," "refund service," and "status service." Each API service to use may use different API fields. For example, the API service "sale API service for payment processing" may support the fields of "amount," "currency," "customer name," "merchant descriptor," "country," and "transaction ID." The first request processor 108A may define features to be used with the API services. For example, the API service "refund service" may use the feature of "partial refunds are supported," whereas the API service "status service" may use the feature of "can be used to fetch the status of a payment or a refund."

At step S404, the implementation establishment system 102 may generate the API simulator module 302A. The API simulator module 302A may be generated such that it may be accessed by the request processor that transmitted the request message. In some embodiments, the API simulator module 302A may be associated with the first request processor 108A that transmitted the request message. In other embodiments, there can be many different API simulator modules, wherein each different API simulator module may be associated with a different request processor. For example, the first request processor 108A may access a first API simulator module, whereas the second request processor 108B may access a second API simulator module.

In some embodiments, the generation of the API simulator module 302A may include the implementation establishment system 102 compiling premade functions, routines, data structures, object classes, variables, and/or remote calls according to the common request processing API specification and the request method model. For example, if the request method model relates to a bank transfer then the API simulator module 302A may include functions and premade code relating to a bank transfer.

At step S406, after receiving the request message, the implementation establishment system 102 may generate the client request stub 210A. The implementation establishment system 102 may generate the client request stub 210A based on the request method model. For example, the request method model may be a bank transfer. The client request stub 210A may be generated such that it may respond to test API calls and API calls that are related to a bank transfer. For example, the implementation establishment system 102 may retrieve premade functions relating to a bank transfer and compile them into a client request stub 210A.

At step S408, after generating the client request stub 210A and the API simulator module 302A, the implementation establishment system 102 may transmit the client request stub 210A to the first request processor 108A.

In some embodiments, the first request processor 108A may generate the client request stub 210A rather than the implementation establishment system 102 generating the client request stub 210A. For example, the user 310 may elect for the first request processor 108A to generate the client request stub 210A.

At step S410, the first request processor 108A may configure the client request stub 210A. In some embodiments, the first request processor 108A may configure the client request stub 210A with the end points, certifications, and the requesting system identifier. The client request stub 210A may be configured to interface with the first request processor 108A. For example, the first request processor 108A may set up a communication channel between the implementation establishment system 102 and the client request stub 210A using the end points.

At step S412, the first request processor 108A may invoke the API simulator at the implementation establishment system 102. In some embodiments, the first request processor 108A may transmit a first message including the request method model and the template to the implementation establishment system 102. The template may be a set of test scenarios for the implementation establishment system 102 to generate test API calls for. The first request processor 108A may be capable of creating and/or using a template to test the client request stub 210A. For example, the template may include a first test scenario in which the test API call is formatted with the correct fields, a second test scenario in which the test API call is formatted without the required "amount" field, a third test scenario in which the test API call is formatted with a non-supported currency code, and a fourth test scenario in which the test API call is formatted with a refund amount more than an original payment amount.

At step S414, after receiving the first message, the implementation establishment system 102 may generate at least one test API call using the call generator 304A. The at least one test API call may be generated based on the request method model and the template. In some embodiments, the call generator 304A may receive the request method model from the gateway configuration persistence 306 via the gateway processing 304. The at least one test API call may include fields as requested by the request method model. The implementation establishment system 102 may generate the at least one test API call as described above and need not be repeated here. In some embodiments, the implementation establishment system 102 may generate at least one expected response. An expected response may be a response that the implementation establishment system 102 expects to receive. The at least one expected response may be formatted based on the common request processing API. In some embodiments, there may be the same number of test API calls and expected responses.

At step S416, the implementation establishment system 102 may transmit the at least one test API call to the client request stub 210A at the first request processor 108A. At step S418, after receiving the test API call, the first request processor 108A may generate at least one response to the at least one test API call. The at least one response may be based on the at least one test API call and may include information related to the type of request method model and template used. For example, the at least one response may include fields for "status," "responseCode," "processorResponse," and "errorMessage." The fields may include subfields. For example, the field "processorResponse" may include the subfields of "paymentRedirectURL" and "error." Furthermore, the subfields may include subfields. For example, the subfield of "paymentRedirectURL" may include the subfields of "type" and "description." As another example, the subfield of "error" may include the subfields of "location," "reason," and "message." The at least one response may be generated in a format following the common request processing API. Any suitable fields and subfields may be used.

In some embodiments, the at least one test API call may be more than one API call. For example, the at least one test API call may be three API calls. The first test API call may relate to the API service "sale API service for payment processing," the second test API call may relate to the API service "refund service," and the third test API call may relate to the API service "status service." The test API calls may be in a particular sequence when sent.

For example, the test API call may be:
 "SaleApiRequest": {
   "billTo": {
     customerName: "Rohit"
     country: NL
   },
   "purchaseTotal": {
     currency: EUR
   },
   "merchantDescriptor": {
     Descriptor: "Big Merchant"
   },
   "paymentDetails": {
     txnID: ABCD1234
   },
 }

An example response to the example test API call above may be:
 "status": "FAILED",
 "responseCode": "10000",
 "processorResponse": {
 "error": [{
 "location": "amount",
 "reason": "missing",
 "message": "Must send amount"
 }, ]
 "errorMessage": "string" ("Amount is required")
 }

In the above example, the test API call was transmitted without an "amount" field. In some embodiments, the test API call may be generated and transmitted without all of the required fields. This may be done in order to test if the client request stub 210A of the first request processor 108A can generate the expected response to an API call with a missing field. In the above example, the response indicates a "status" of "FAILED," a "location" of "amount," and a "reason," of "missing."

In another example, the test API call may include a non-supported currency code. For example, the first request processor 108A may be operated by a merchant in Europe. The merchant may only accept euros as currency. In this example, the request method model may support a field of "purchaseTotal" with a subfield of "currency," wherein the "currency" subfield must be EUR. An example test API call with the "currency" subfield set to USD is shown below:
 "SaleApiRequest": {
   "billTo": {
     customerName: "Rohit"
     country: NL
   },
   "purchaseTotal": {
     Amount: 10
     currency: USD
   },
   "merchantDescriptor": {
     Descriptor: "Big Merchant"
   },
   "paymentDetails": {
     txnID: ABCD1234
   }
 }
Since the test API call included a non-supported currency code, the expected response would be:
 "status": "FAILED",
 "responseCode": "10000",
 "processorResponse": {
 "error": [{
 "location": "currency",
 "reason": "invalid",
 "message": "Only EUR is supported as currency"
 },]
 "errorMessage": "string" ("Only EUR is supported as currency")
 }

In this example, the expected response includes a "status" of "failed." The expected response indicates that the "currency" subfield in the test API call was invalid because only EUR is supported as currency.

In yet another example, two test API calls may be sent from the implementation establishment system 102 to the first request processor 108A. The first test API call may be for a purchase and may include a purchase total of 10 EUR. The second test API call, below, may be for a refund of the previous purchase. The second test API call may be sent with a refund total of 20 EUR. The expected response, below, may include an error and may state that the refund amount is higher than the original amount. The example test API call:
 "RefundApiRequest": {
   "purchaseTotal": {
     Amount: 20
     currency: EUR
   },
   "merchantDescriptor": {
     Descriptor: "Big Merchant"

},
"paymentDetails": {
    txnID: ABCD1234
},
}
An example expected response:
"status": "FAILED",
"responseCode": "10000",
"processorResponse": {
"error": [
{
"location": "currency",
"reason": "invalid",
"message": "Refund amount is higher than original payment amount" },
"errorMessage": "string" ("Refund amount is higher than original payment amount")
}

In another example, the test API call may include the required fields, based on the request method model. The test API call, below, may be transmitted from the implementation establishment system 102 to the first request processor 108A. The expected response, below, indicates the successful creation of a payment redirect URL.

"SaleApiRequest": {
    "billTo": {
        customerName: "Rohit"
        country: NL
    },
    "purchaseTotal": {
        Amount: 10
        currency: EUR
    },
    "merchantDescriptor": {
        Descriptor: "Big Merchant"
    },
    "paymentDetails": {
        txnID: ABCD1234
    }
}
An example expected response:
"SaleAPIResponse": {
"status": "SUCCESS",
"responseCode": "10000",
"processorResponse": {
"paymentRedirectURL": [
{
"type": "https://xyzbank.com/tthis784uhjrjhhujshd854j"
"description": "URL successfully created",
},
}

In this example, since the test API call includes all of the required fields in the correct format, the expected response is a creation of a payment redirect URL.

At step S420, after generating the at least one response, the first request processor 108A may transmit the at least one response to the implementation establishment system 102. At step S422, after receiving the at least one response, the implementation establishment system 102 may verify the at least one response. In some embodiments, verifying the at least one response may include comparing the at least one response to the at least one expected response. The implementation establishment system 102 may determine if particular subfields of the response match the respective subfields of the expected response. For example, the at least one response may include a subfield of "merchantDescriptor" set to "Merchant A." The expected response, however, may include a subfield of "merchantDescriptor" set to "Merchant B." In this case the response is different than the expected response, therefore the implementation establishment system 102 may determine that the at least one test API call and the at least one response do not match.

At step S424, the implementation establishment system 102 may generate a response notification based on the at least one response to the at least one test API call. The response notification may include an success indicator, a reason, and a list of differences. The success indicator may indicate if the response failed or if the response succeeded. The reason may describe why the response failed or succeeded. The list of differences may list differences between the response and the expected response.

The response notification may relate to more than one test API call. For example, if three test API calls were transmitted from the implementation establishment system 102 to the first request processor 108A and three responses were transmitted from the first request processor 108A to the implementation establishment system 102, then the response notification may include three success indicators, three reasons, and three lists of differences.

In some embodiments, the reason may be that the test response message was formatted incorrectly. For example, the first request processor 108A may have responded with an incorrect field or subfield. Another reason may be that there was a communication failure between the first request processor 108A and the implementation establishment system 102. For example, there may be a network outage which causes the implementation establishment system 102 not to receive the response. In this case there may be a predetermined amount of time before the implementation establishment system 102 indicates that the response failed. The predetermined amount of time may be any suitable amount of time (e.g., 30 minutes, 4 hours, 1 day, etc.). In some embodiments, other reasons may relate to fields, subfields, content, and formatting. In other embodiments, if the success indicator indicates that the response was a success, then the reason may be "properly formatted response" or any other suitable message.

At step S426, the implementation establishment system 102 may transmit the response notification to the first request processor 108A. At step S428, after receiving the response notification, the first request processor 108A may determine whether or not to configure the client request stub 210A based on the response notification. In some embodiments, the first request processor 108A may configure the client request stub 210A if the at least one response does not match the at least one expected response. The client request stub 210A may be configured such that it properly formats responses according to the common request processing API. For example, if the response notification indicates that the "type" subfield in the response is different than the "type" subfield in the expected response, then the first request processor 108A may configure the client request stub 210A to alter the way the "type" subfield is generated.

In some embodiments, if the success indicator of the response notification indicates that the response failed, then the first request processor 108A may repeat the preceding steps, starting at step S412. The first request processor 108A may repeat the steps until the success indicator indicates that the response succeeded.

In some embodiments, if the success indicator indicates that the response succeeded, then the first request processor 108A may determine not to configure the client request stub 210A. The first request processor 108A may then transmit a certification request to the implementation establishment system 102. In some embodiments, the certification request may include a request to have the request processor's client request stub be certified by the implementation establishment system 102. The implementation establishment system 102 may evaluate the certification request and certify the request processor within a predetermined time-frame. In some embodiments, the implementation establishment system 102 may determine to certify the request processor's client request stub. In other embodiments, the implementation establishment system 102 may determine not to certify the request processor's client request stub.

In some embodiments, if the request processor's client request stub is certified, the client request stub may be considered an implementation, and the first request processor 108A may receive requests from the requesting system 104 via the request formatting platform 106.

Figure 5:
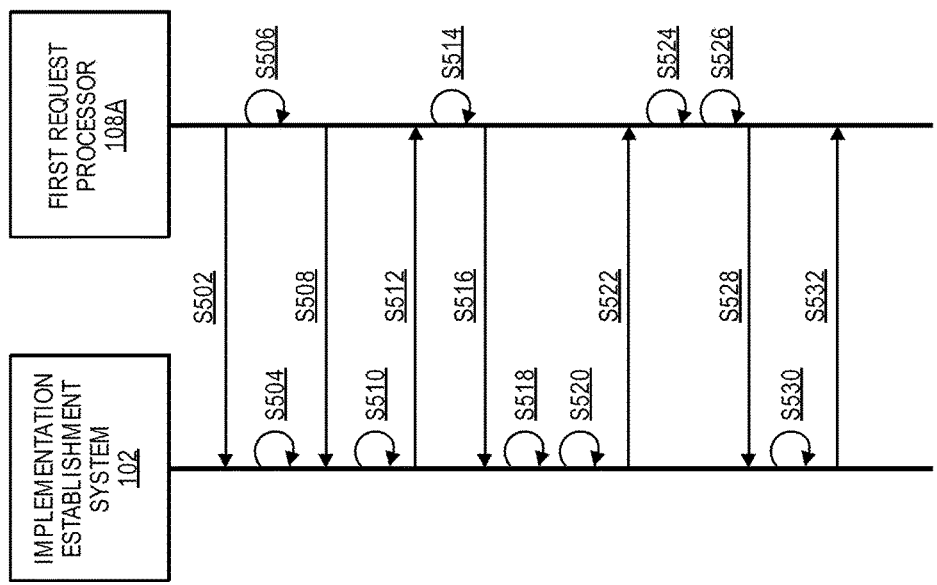
FIG. 5 shows a flow diagram illustrating an alternate method for establishing an implementation for a request processor according to an embodiment of the invention.

FIG. 5 shows a flow diagram illustrating an alternate method for establishing requests for a request processor according to an embodiment of the invention. The method illustrated in FIG. 5 will be described in the context of a request method model of a healthcare request. It is understood, however, that the invention can be applied to other circumstances (e.g., payments, healthcare, banking, retail, shipping, utilities, data management, education, manufacturing, etc.). Although the steps are illustrated in a specific order, it is understood that embodiments of the invention may include methods that have the steps in different orders. In addition, steps may be omitted or added and may still be within embodiments of the invention. The specifics of how the client request stub 210A is generated, how the messages are transmitted, and other details have been described above and need not be repeated here.

In some embodiments, the first request processor 108A may be a server computer associated with a healthcare provider. The first request processor 108A may want to receive API calls from requesting systems.

At step S502, the first request processor 108A may transmit a request message to the implementation establishment system 102. The request message may include a request to generate an API simulator module and a request method model. Upon receiving the request message, at step S504, the implementation establishment system 102 may generate the API simulator module. At step S506, the first request processor 108A may generate a client request stub 210A. In some embodiments, step S504 and step S506 may occur at the same or a similar time. In other embodiments, after generating the API simulator module, the implementation establishment system 102 may transmit a message to the first request processor 108A that indicates that the API simulator module has been generated.

At step S508, the first request processor 108A may transmit a first message including a request method model and a template to the implementation establishment system 102. For example, the request method model may relate to a healthcare request. The template, in this example, may include a first test scenario in which the test API call is formatted with the correct fields, a second test scenario in which the test API call is formatted without a required "date" field, and a third test scenario in which the test API call is formatted with an invalid physician license number.

At step S510, the implementation establishment system 102 may generate at least one test API call based on the request method model and the template. For example, the implementation establishment system 102 may generate three test API calls since the template includes three test scenarios. A first test API call may include the correct fields, a second test API call may not include a required "date" field, and a third test API call may include an invalid physician license number.

At step S512, the implementation establishment system 102 may transmit the at least one test API call to the first request processor 108A. At step S514, after receiving the at least one test API call, the first request processor 108A may generate at least one response based on the at least one test API call. In this example, since the at least one test API call is three test API calls, the first request processor 108A may generate three responses. A first response may not include an error field, a second response may include an error field set to "date field required," and a third response may include an error field set to "invalid physician license number" with a subfield of location set to "LicenseNumber."

At step S516, the first request processor 108A may transmit the at least one response to the implementation establishment system 102. At step S518, after receiving the at least one response, the implementation establishment system 102 may evaluate the at least one response. The implementation establishment system 102 may have previously generated at least one expected response. The implementation establishment system 102 may compare the at least one response to the at least one expected response. For example, the implementation establishment system 102 may have previously generated three expected responses since the implementation establishment system 102 generated three test API calls. A first expected response may not include an error field, a second expected response may include an error field set to "date field required," and a third expected response may include an error field set to "invalid physician license number" with a subfield of location set to "LicenseNumber." In this example, the three responses match the three expected responses, respectively.

At step S520, the implementation establishment system 102 may generate a response notification based on the at least one response. In this example, the response notification may indicate that all of the test API calls succeeded.

At step S522, the implementation establishment system 102 may transmit the response notification to the first request processor 108A. At step S524, after receiving the response notification, the first request processor 108A may determine if the response notification indicates a success. In this example, the implementation establishment system 102 may determine that the response notification indicates a success.

At step S526, after determining that the response notification indicates a success, the first request processor 108A may generate a certification request. The certification request may include a request to have the client request stub be certified by the implementation establishment system 102.

At step S528, the first request processor 108A may transmit the certification request to the implementation establishment system 102. At step S530, after receiving the certification request, the implementation establishment system 102 may determine to certify the client request stub 210A of the first request processor 108A. The implementation establishment system 102 may determine to certify the client request stub 210A based on a number of criteria. One criterion may be if the client request stub 210A previously generated correctly formatted responses. Another criterion may be based on risk factors. Other criteria may be predetermined by the implementation establishment system 102.

At step S532, the implementation establishment system 102 may transmit a certification response to the first request processor 108A. The certification response may indicate if the client request stub 210A has been certified or not.

Embodiments of the invention provide for a number of advantages. One advantage is that the request processor may define a request method model and template to test the request processor's client request stub. This is advantageous because the request processor can code to the common request processing API, but may not need additional inputs from the request formatting platform as in previous methods and systems. The request processor may interact automatically with the implementation establishment system 102.

Furthermore, embodiments of the invention reduce the number of steps to establish an implementation as opposed to prior methods, described above. For example, embodiments of the invention allow for the request processor to automatically receive API calls, respond to the API calls, and receive data relating to the API calls and responses. In previous methods the users of the request processor and the formatting request platform would need to communicate with one another, usually via email, to set up API calls between the machines. The reduction in the number of steps allows embodiments of the invention to be more efficient than previous methods.

Another advantage is that embodiments of the invention allow for a much faster certification of the implementing than previous methods. This is due to, at least, the reduction in steps that a human would perform. Another advantage is that the time between generating a response at the request processor and receiving the response notification at the request processor is greatly reduced compared to previous methods and systems.

Another advantage is that the request processor can request certification immediately after establishing the request processor's client request stub.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:
1. A method comprising:
receiving, by an implementation establishment system over a network from a request processor, a request message, wherein the request message causes generation of a client request stub and a simulator module;
generating, by the implementation establishment system, the simulator module;
generating, by the implementation establishment system, the client request stub;
transmitting, by the implementation establishment system over the network, the client request stub to the request processor;
receiving, by the implementation establishment system over the network, a first message including a request method model and a template from the request processor;
generating, by the implementation establishment system, at least one test API call based on the request method model and the template, wherein the template includes a test scenario for the implementation establishment system to generate API test calls;
transmitting, by the implementation establishment system over the network, the at least one test API call to the request processor;
receiving, by the implementation establishment system over the network, at least one response based on the at least one test API call from the request processor;
evaluating, by the implementation establishment system, the at least one response by generating, by the implementation establishment system, at least one expected response based on the request method model and the template, and comparing, by the implementation establishment system, the at least one response to the at least one expected response;
generating, by the implementation establishment system, a response notification based on the at least one response; and
transmitting, by the implementation establishment system over the network, the response notification to the request processor, wherein the response notification provides data to update the client request stub in the request processor, and wherein the method further comprises:

receiving, by the implementation establishment system, a certification request including a request to have the client request stub be certified by the implementation establishment system; and determining, by the implementation establishment system, to certify the client request stub based on at least the certification request.

2. The method of claim 1, wherein the at least one test API call, the at least one response, and the at least one expected response are formatted based on an API specification of a request formatting platform associated with the implementation establishment system.

3. The method of claim 1, wherein the request method model and the template relate to data management.

4. The method of claim 1, wherein the response notification includes one or more of a success indicator, a reason, or a list of differences.

5. The method of claim 1, wherein the at least one test API call comprises a first API test call for a purchase for a first amount, and a second API test call for a refund for a second amount, different from the first amount.

6. The method of claim 1, further comprising, transmitting the client request stub to a plurality of request processors including the request processor.

7. An implementation establishment system comprising:
a processor;
a memory device; and
a computer-readable medium coupled to the processor, the computer-readable medium comprising code executed by the processor implementing a method comprising:
receiving a request message from a request processor over a network, wherein the request message causes generation of a client request stub and a simulator module;
generating the simulator module;
generating the client request stub;
transmitting, over the network, the client request stub to the request processor;
receiving a first message including a request method model and a template over the network from the request processor;
generating at least one test API call based on the request method model and the template, wherein the template includes a test scenario for the implementation establishment system to generate API test calls;
transmitting the at least one test API call over the network to the request processor;
receiving at least one response based on the at least one test API call from the request processor over the network;
evaluating the at least one response by generating at least one expected response based on the request method model and the template, and comparing the at least one response to the at least one expected response;
generating a response notification based on the at least one response; and
transmitting the response notification to the request processor over the network, wherein the response notification provides data to update the client request stub in the request processor, and wherein the method further comprises:
receiving, by the implementation establishment system, a certification request including a request to have the client request stub be certified by the implementation establishment system; and
determining, by the implementation establishment system, to certify the client request stub based on at least the certification request.

8. The implementation establishment system of claim 7, wherein the at least one test API call, the at least one response, and the at least one expected response are formatted based on an API specification of a request formatting platform associated with the implementation establishment system.

9. The implementation establishment system of claim 7, wherein the request method model and the template relate to data management.

10. The implementation establishment system of claim 7, wherein the response notification includes one or more of a success indicator, a reason, or a list of differences.

* * * * *